(12) United States Patent
Marraffa

(10) Patent No.: US 7,575,828 B2
(45) Date of Patent: Aug. 18, 2009

(54) MODULAR RACK ASSEMBLIES FOR SEALED LEAD ACID BATTERIES

(75) Inventor: Andrew Marraffa, Exton, PA (US)

(73) Assignee: Kim Manufacturing Co., Downingtown, PA (US)

( * ) Notice: Subject to any disclaimer, the term of this patent is extended or adjusted under 35 U.S.C. 154(b) by 801 days.

(21) Appl. No.: 11/187,530

(22) Filed: Jul. 22, 2005

(65) Prior Publication Data

US 2006/0028171 A1 Feb. 9, 2006

Related U.S. Application Data

(60) Provisional application No. 60/590,321, filed on Jul. 23, 2004.

(51) Int. Cl.
 *H01M 2/10* (2006.01)
(52) U.S. Cl. .............................. 429/99; 429/96; 429/100
(58) Field of Classification Search .................... 429/62, 429/96, 97, 98, 99, 100, 152, 159, 162; 211/26.2, 211/49.1, 175, 186; 206/703; 29/730; 312/107, 312/108, 263, 264; 248/71, 74.4, 117.2, 248/346.01
 See application file for complete search history.

(56) References Cited

U.S. PATENT DOCUMENTS

| | | | | | |
|---|---|---|---|---|---|
| 3,858,752 | A | * | 1/1975 | Marvin et al. ............... | 220/325 |
| 4,428,304 | A | * | 1/1984 | Moser ......................... | 108/65 |
| 4,730,735 | A | * | 3/1988 | Lechner .................... | 211/41.12 |
| 5,735,411 | A | * | 4/1998 | Flamme et al. ............... | 211/26 |
| 6,482,541 | B1 | * | 11/2002 | Bator et al. ................. | 429/100 |
| 2002/0015880 | A1 | * | 2/2002 | Heimer ........................ | 429/97 |
| 2002/0179552 | A1 | * | 12/2002 | Marraffa .................... | 211/49.1 |

* cited by examiner

*Primary Examiner*—Dah-Wei D Yuan
*Assistant Examiner*—Stephan Essex
(74) *Attorney, Agent, or Firm*—Eugene E. Renz, Jr., PC

(57) ABSTRACT

A module for a battery system supporting batteries during seismic stress comprising a pair of side panels, each panel formed of material such as steel shaped to define a generally rectangular face and top and bottom flanges extending generally perpendicularly to the face along top and bottom edges thereof and side flanges formed integrally with the face and top and bottom flanges, a base plate having means for mounting the module to a support surface having a generally U-shaped channel formed integrally along the front and rear edges of the base plate, a rear panel extending between and nested in the side panels and secured thereto and the base plate, at least one pair of front and rear support channels extending between the side panels, a shelf for batteries supported on the base plate and support channels, a support channel extending vertically between the top and bottom flanges, and means for securing modules stacked one on top of another along the top and bottom flanges.

1 Claim, 24 Drawing Sheets

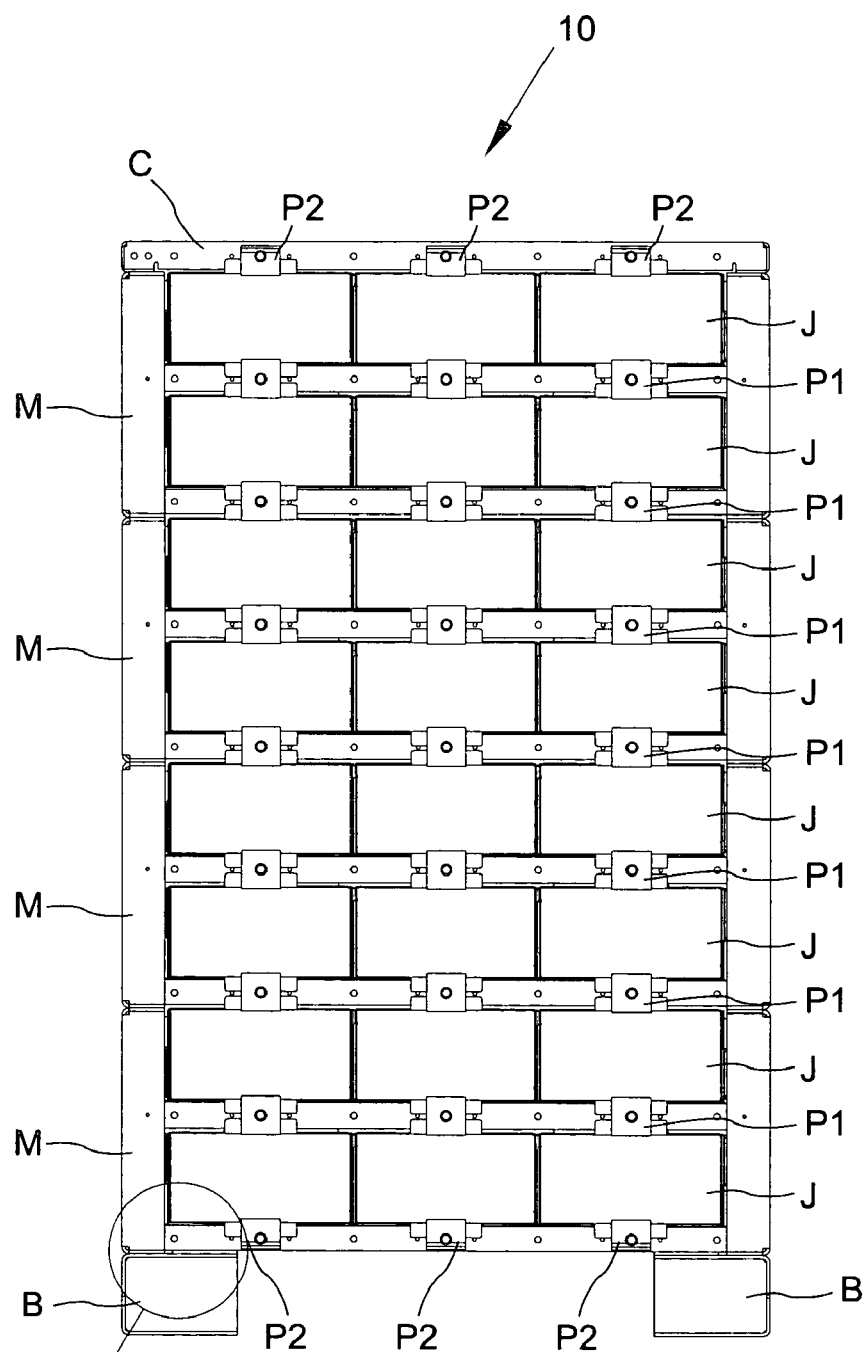
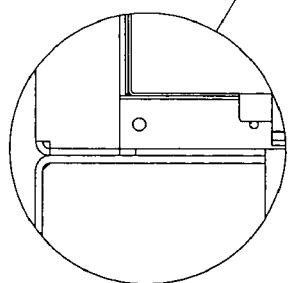
FIGURE 1
FIGURE 1a

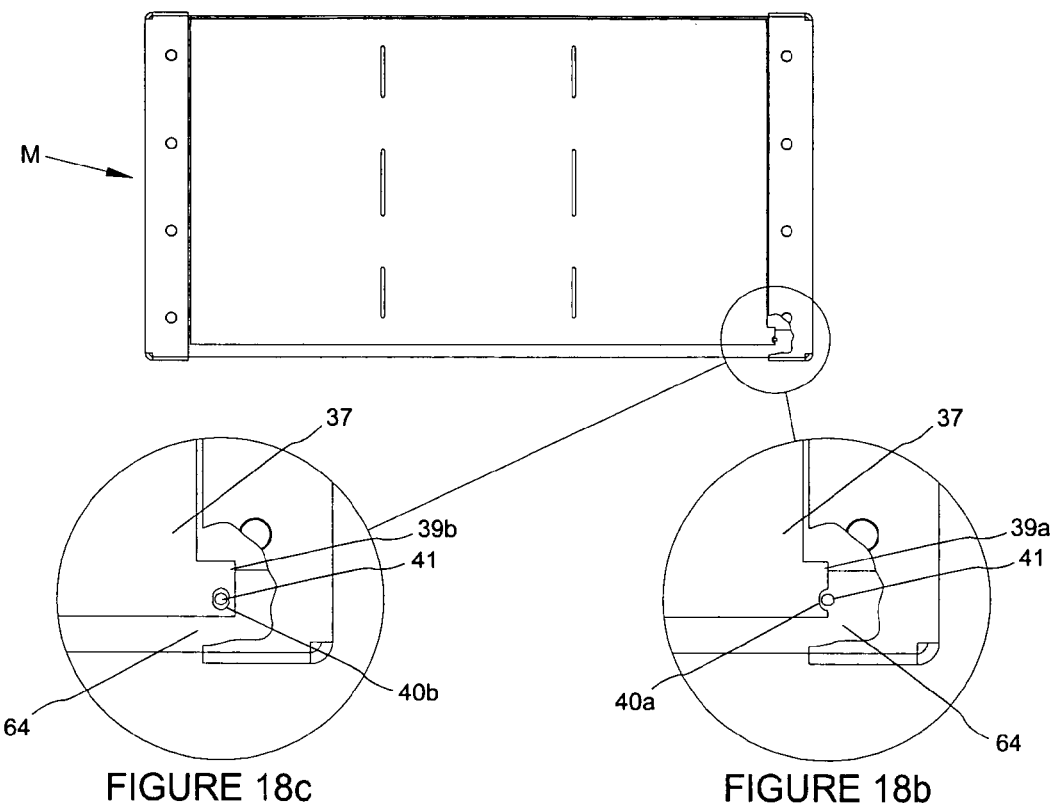
FIGURE 18a
FIGURE 18c
FIGURE 18b
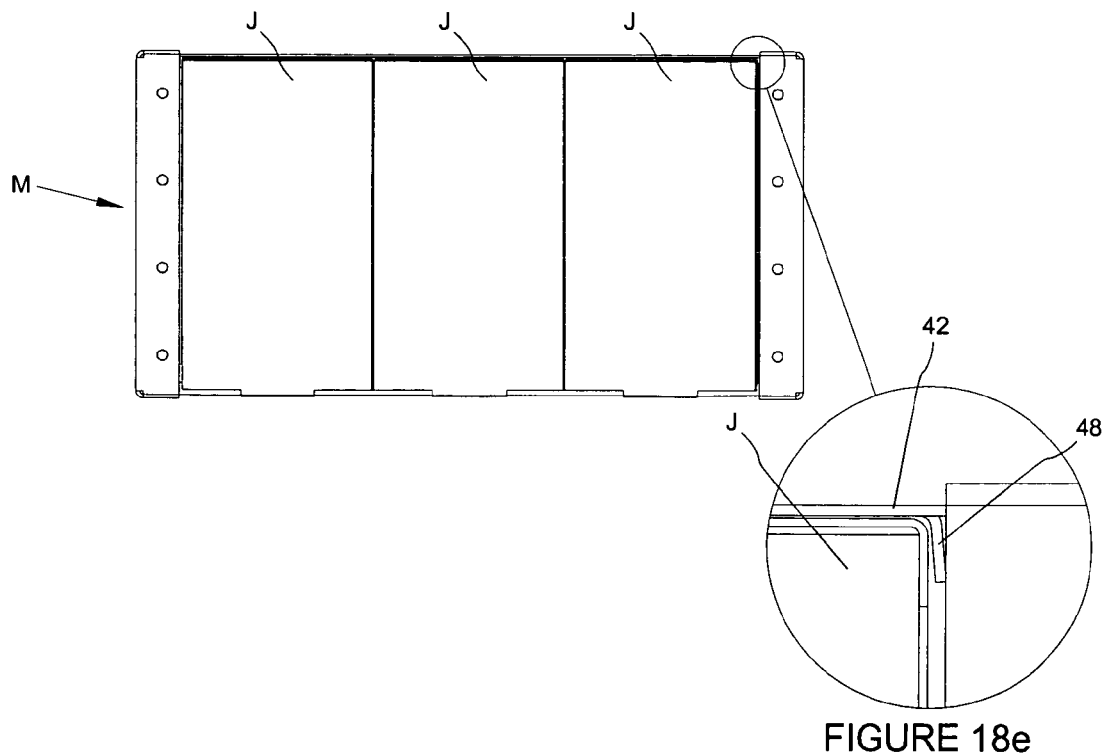
FIGURE 18d
FIGURE 18e

TOP VIEW

BOTTOM VIEW

MODULAR RACK ASSEMBLIES FOR SEALED LEAD ACID BATTERIES

This Regular Patent Application claims the benefit of Provisional Patent Application No.: 60/590,321 filed Jul. 23, 2004 entitled: MODULAR BATTERY RACK SYSTEM

FIELD OF THE INVENTION

The present invention relates to improvements in modular rack assemblies for supporting and storing batteries. More specifically, the present invention provides a modular system characterized by novel features of construction and arrangement providing an uninterruptible back-up power source which meets the seismic requirements of Telcordia GR-63 Core Nebs Zone 4.

DESCRIPTION OF THE PRIOR ART

A typical prior art battery rack system is shown in U.S. Pat. No. 6,719,150B2 issued Apr. 13, 2004 and entitled BATTERY RACK AND SYSTEM. This battery rack and system comprises a frame device for supporting a plurality of batteries and thereby providing a power source to maintain operations when the primary power source shuts down. The rack comprises a pair of end frame members mounted in upstanding spaced apart relation by a plurality of vertically spaced elongated channel support members secured at opposite terminal ends to the vertical columns of the end frame members. Shelves for supporting the batteries span the channel support members and define a plurality of compartments for the batteries. Each end frame member is formed of a single sheet of material shaped to define vertical columns and a web extending between the end columns. The end frame members thus define four elongated columns or posts at the four corners of the rack which extend the full height of the rack. Even though the shelves and the channel support members provide stability to the columns, they are subject to some twisting and turning when seismic loads are applied during testing and the distortion of the structure can in some instances be severe enough to cause system and/or battery damage and failure which could disrupt the power source. Two pairs of anchors secures the battery rack system to a support surface such as a slab of concrete. High seismic loads can create large turnover moments causing anchors to pull or break out of the concrete floor resulting in a catastrophic system failure.

Other similar battery rack systems of interest are shown in the patents listed below:

| INVENTOR | TITLE | U.S PAT. NO.: |
|---|---|---|
| Stone | MODULAR CELL TRAY ASSEMBLY FOR SEALED LEAD-ACID CELLS | 5,981,101 |
| Bator, et al. | BATTERY SLEEVE FRAME | 6,482,541 |
| Stone | MODULAR CABINET FOR LARGE-SIZED SEALED LEAD-ACID CELLS | 5,304,434 |
| Shaffer, et al. | SEALED LEAD-ACID CELL HAVING A NOVEL LUG, AND END COVER ASSEMBLY | 5,227,266 |

Even though these systems are generally effective for the purposes intended, none of them meet the most stringent seismic requirements of the Telcordia GR-63 Core Nebs Zone 4 applications.

SUMMARY OF THE INVENTION

In view of the above, it is the primary object of the present invention to provide a modular system characterized by novel features of construction and arrangement which is easy and economical to manufacture and which meets the Telcordia GR-63 Core Nebs Zone 4 seismic requirements. To this end, the rack of the present invention comprises several modules, each module of a size to accommodate two or three rows of two volt batteries and which can be secured to one another to provide varying voltage systems and wherein the modules have a unique and rigid structure preventing torquing or twisting of the assembled modules so that they are capable of withstanding Telcordia GR-63 Core Nebs Zone 4 seismic conditions and forces.

Each module comprises a pair of identical side panels of rectangular shape having inwardly directed flanges around its periphery including top and bottom flanges and side flanges connecting the top and bottom flanges. The top and bottom flanges of each module have a series of spaced bolt holes so that the modules can be stacked and rigidly secured together along the top and bottom flanges. An elongated L-shaped end panel stiffener underlies the top flange of the side panels. The module also includes vertical U-shaped stiffeners spaced inwardly from the open end and extending between the upper and lower panel flanges and generally parallel to the side flanges of the side panels.

The bottom plate of each module has upturned support channels of U-shaped cross section facing inwardly. A shelf for the batteries sits on the support channels and has a tab at least at one corner with a hole for a bolt to ground the shelf to the module. Two row modules have a second or upper shelf support channel arrangement. Three row modules have a second and third row upper shelf support channel arrangement.

Each module has a rear panel which nests between the side panels and is secured thereto by a weldment forming a relatively rigid box like structure and includes positioning tabs formed integrally with the rear panel and confronting the batteries to prevent lateral movement. The batteries are secured at their front end by the jacket tabs bolted to the channel supports.

This unique arrangement of elements comprising the module provides a box like structure which resists torquing and turning when extreme seismic loads are applied to protect the batteries seated in rows on the shelves.

Another feature of the present invention is a base configuration having multiple mounting holes to attach the lowest module to the base and anchor holes to secure the base to a support surface whereby the unit is capable of withstanding high loads from turn over moments.

A further object of the present invention is to provide a modular system comprised of a plurality of modules wherein the modules can be substantially completely assembled off the site and simply stacked one on top of the other at the site and secured together and anchored in place.

The present invention is characterized by a novel design wherein the modules may be assembled at the site and the array anchored in place solely through access from the open front end of the modules and thus the modular rack may be installed and anchored in a very tight space. More specifically, the base elements can be assembled to the lowest module in the stack and preliminarily positioned in a small confined space. The anchor bolt locations are then marked. The base and lowest module are removed from the space to drill the anchor holes in the support surface. The subassembly is then repositioned for final anchoring. The anchor bolts can be located and secured solely by tools from the front access only. The remaining modules and cover are then easy to assemble via front access. This provides ease of assembly and significant cost saving particularly where mounting areas are comparatively expensive.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is a front elevational view of a rack assembly comprising a series of stacked modules in accordance with the present invention;

FIG. 1a is an enlarged fragmentary view of the portion circled in FIG. 1 showing flush mounting of the lowest module to the base;

FIG. 18a is a top plan view showing the tab construction of a shelf to provide a grounding means;

FIGS. 18b and 18c are enlarged fragmentary views of the shelf portion shown in FIG. 18a illustrating two versions of grounding tabs and slots;

FIG. 18d is a top plan view of a tier of batteries in jackets J;

FIG. 18e is an enlarged fragmentary view of the portion circled in FIG. 18d showing the back panel tab 48 for limiting lateral movement of the batteries.

BRIEF DESCRIPTION OF PREFERRED EMBODIMENTS

Figure 7:
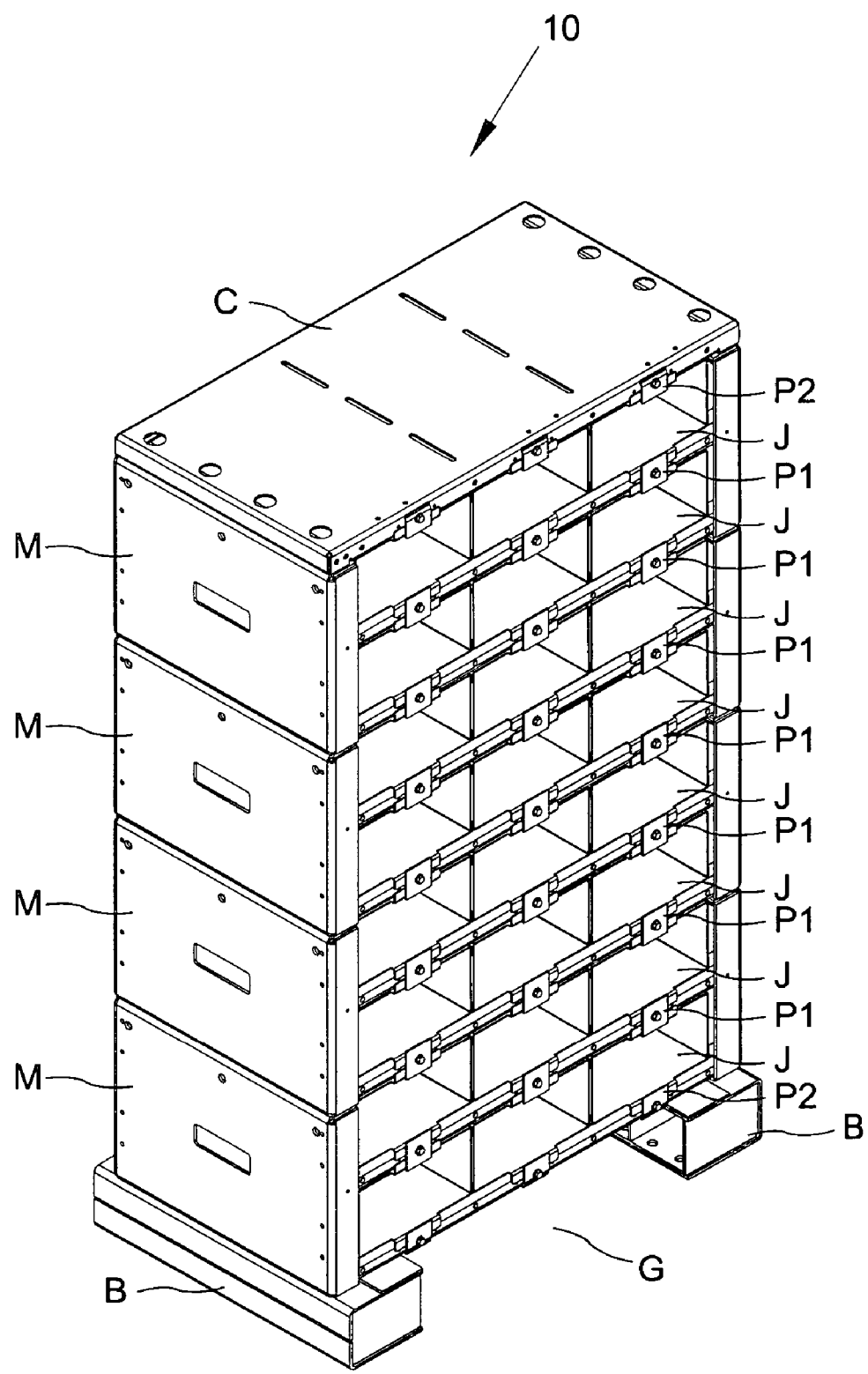
FIG. 7 is a perspective view of a four module stack.
Figure 8:
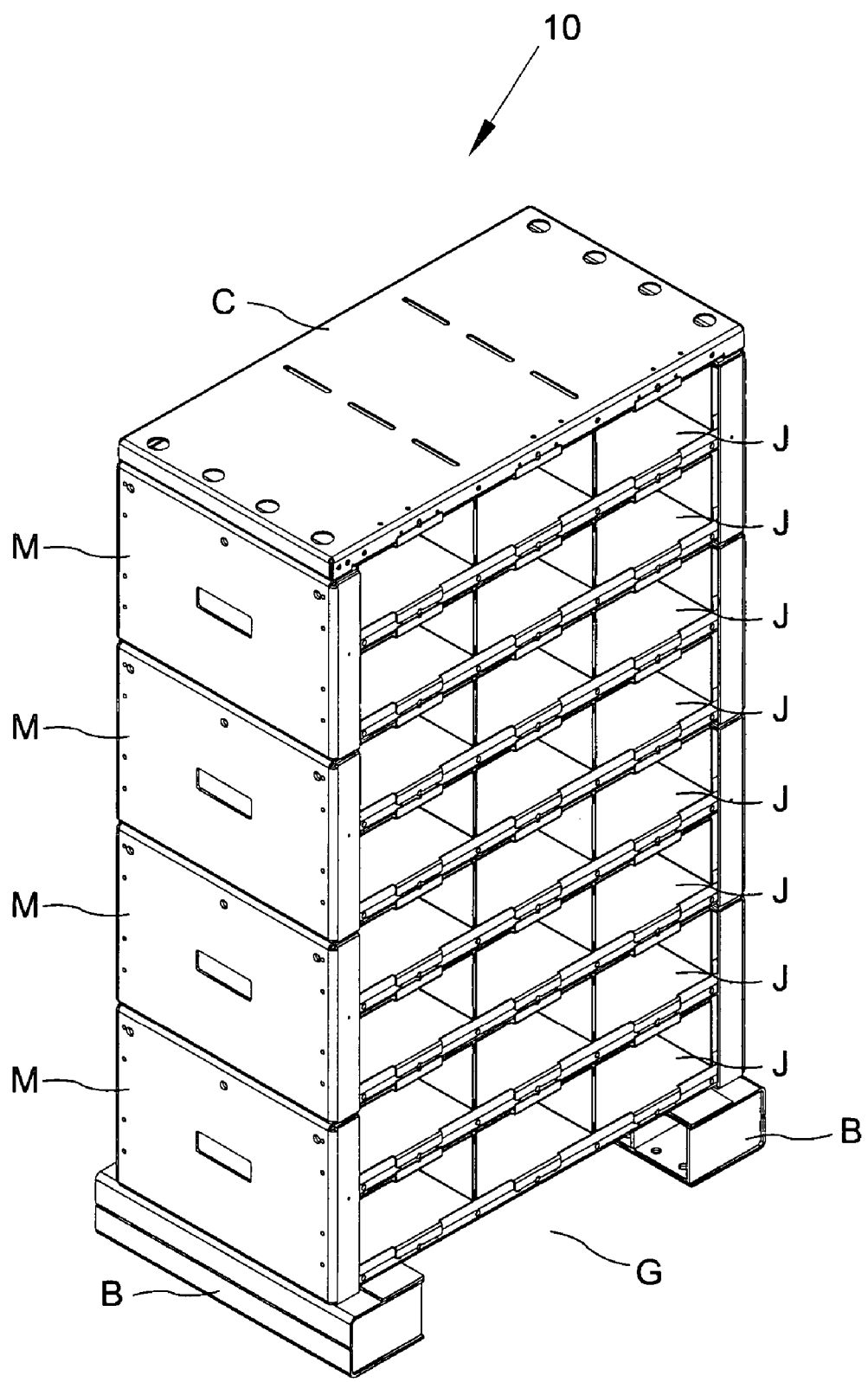
FIGS. 8-12 are perspective views showing the four module stack with parts removed to show the internal construction more clearly.
Figure 9:
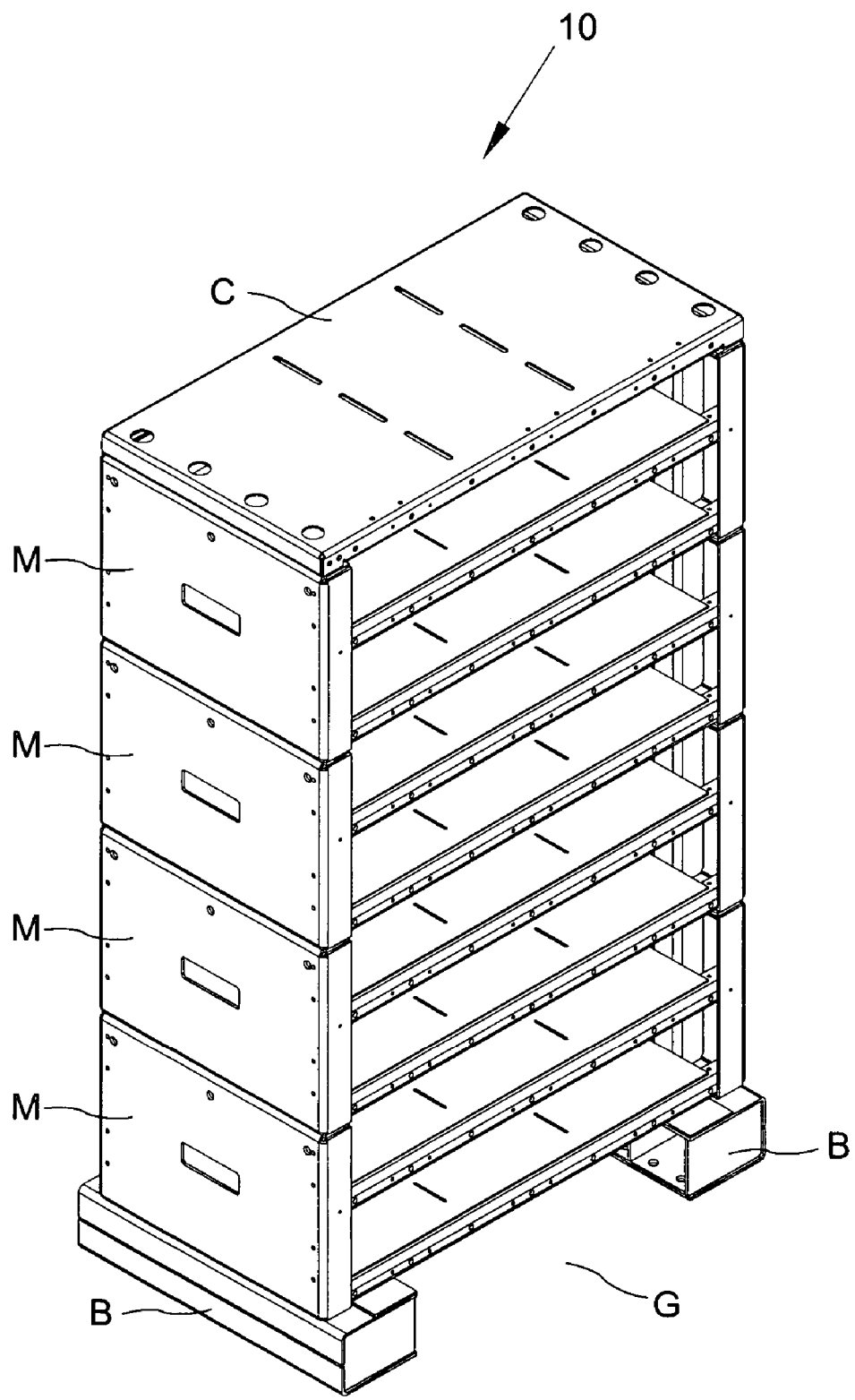
Figure 10:
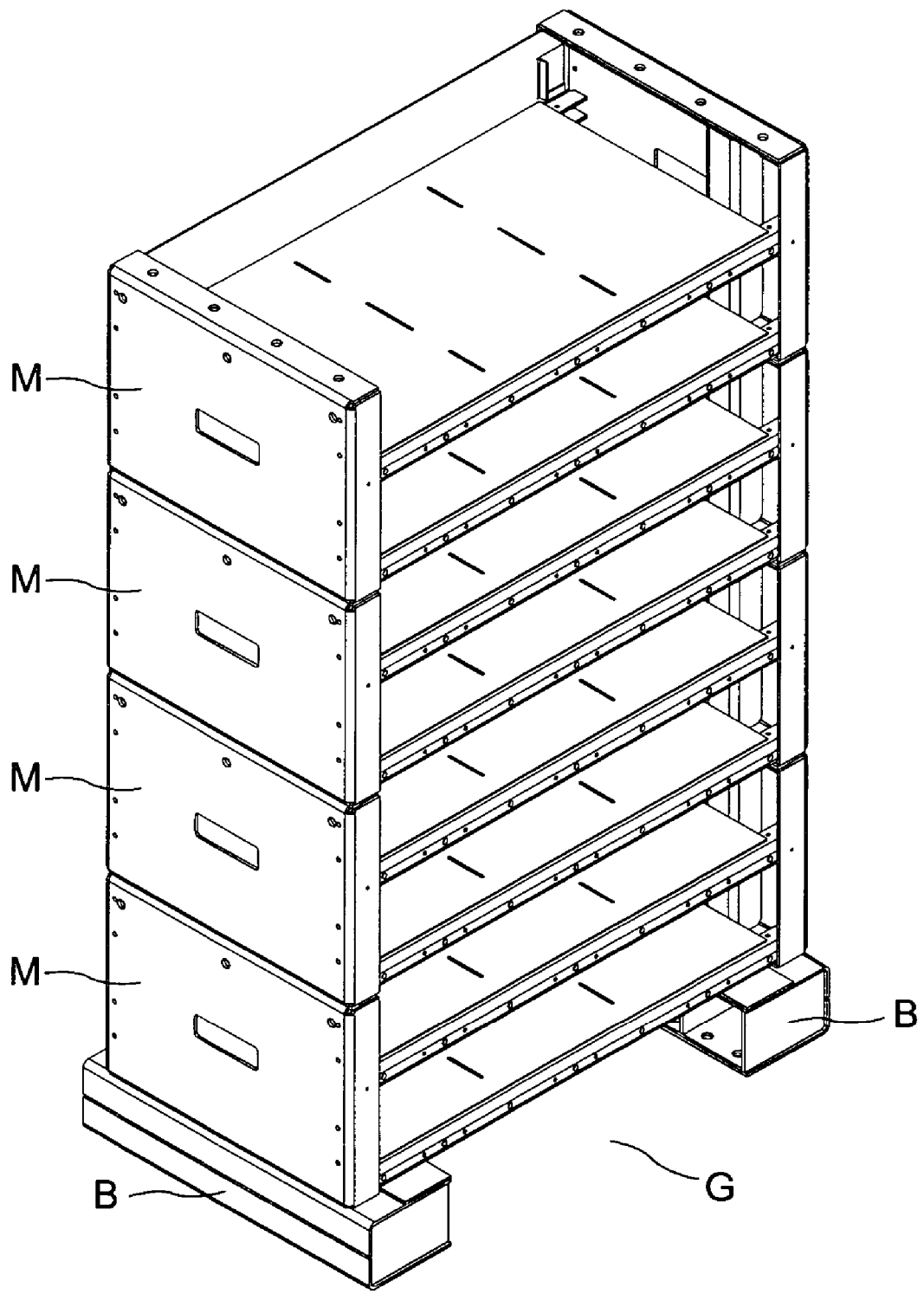
Figure 11:
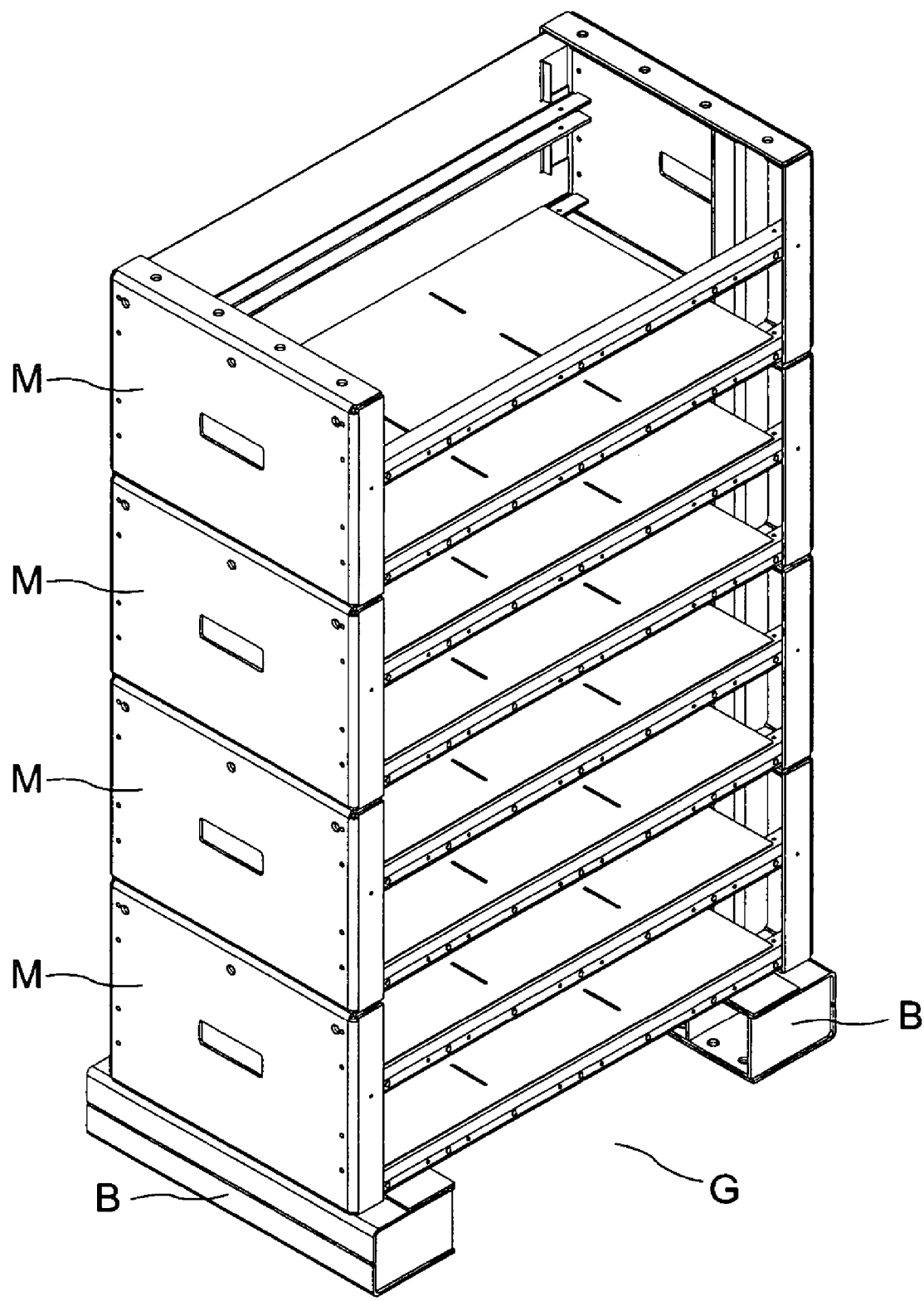
Figure 12:
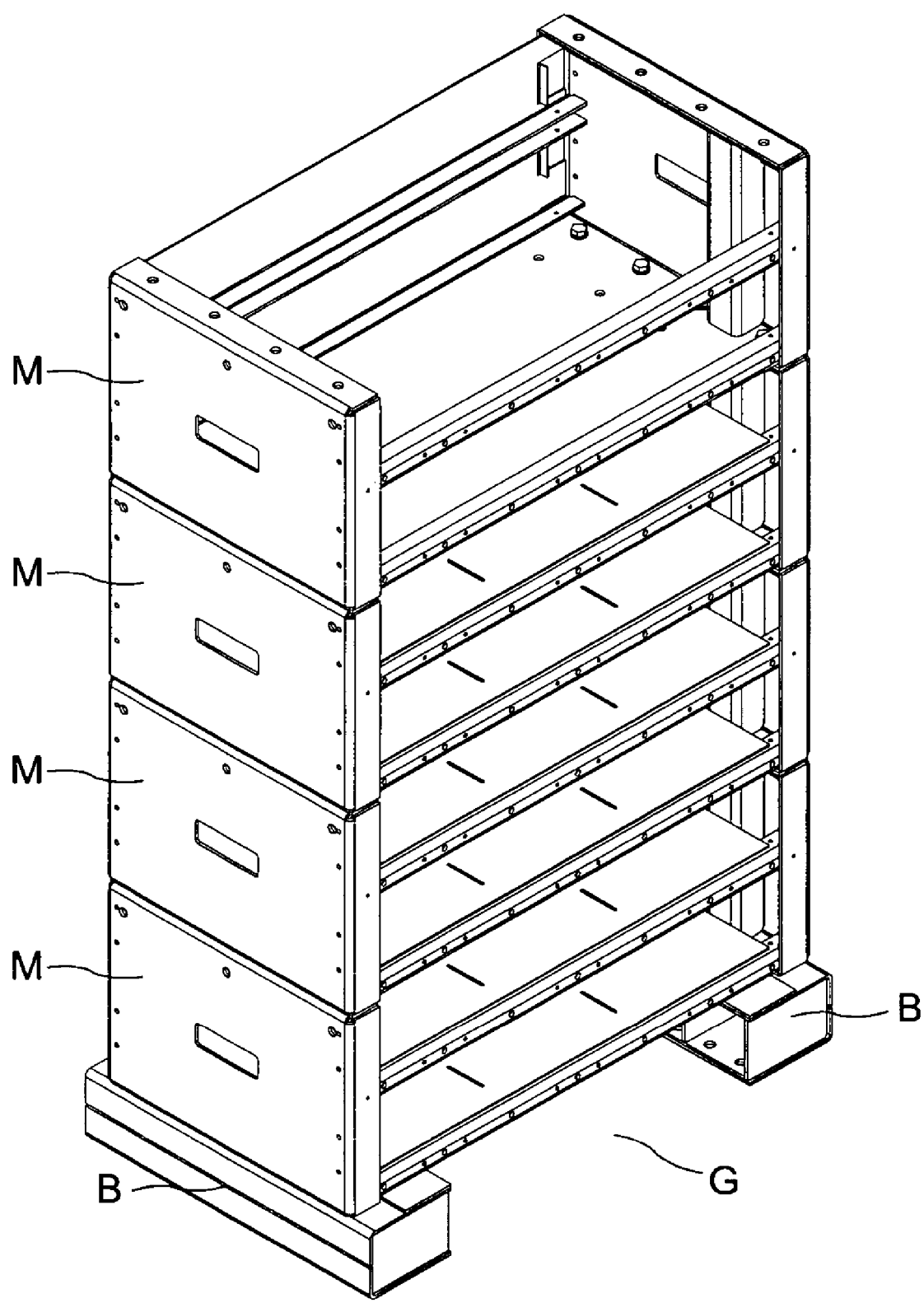
Figure 13:
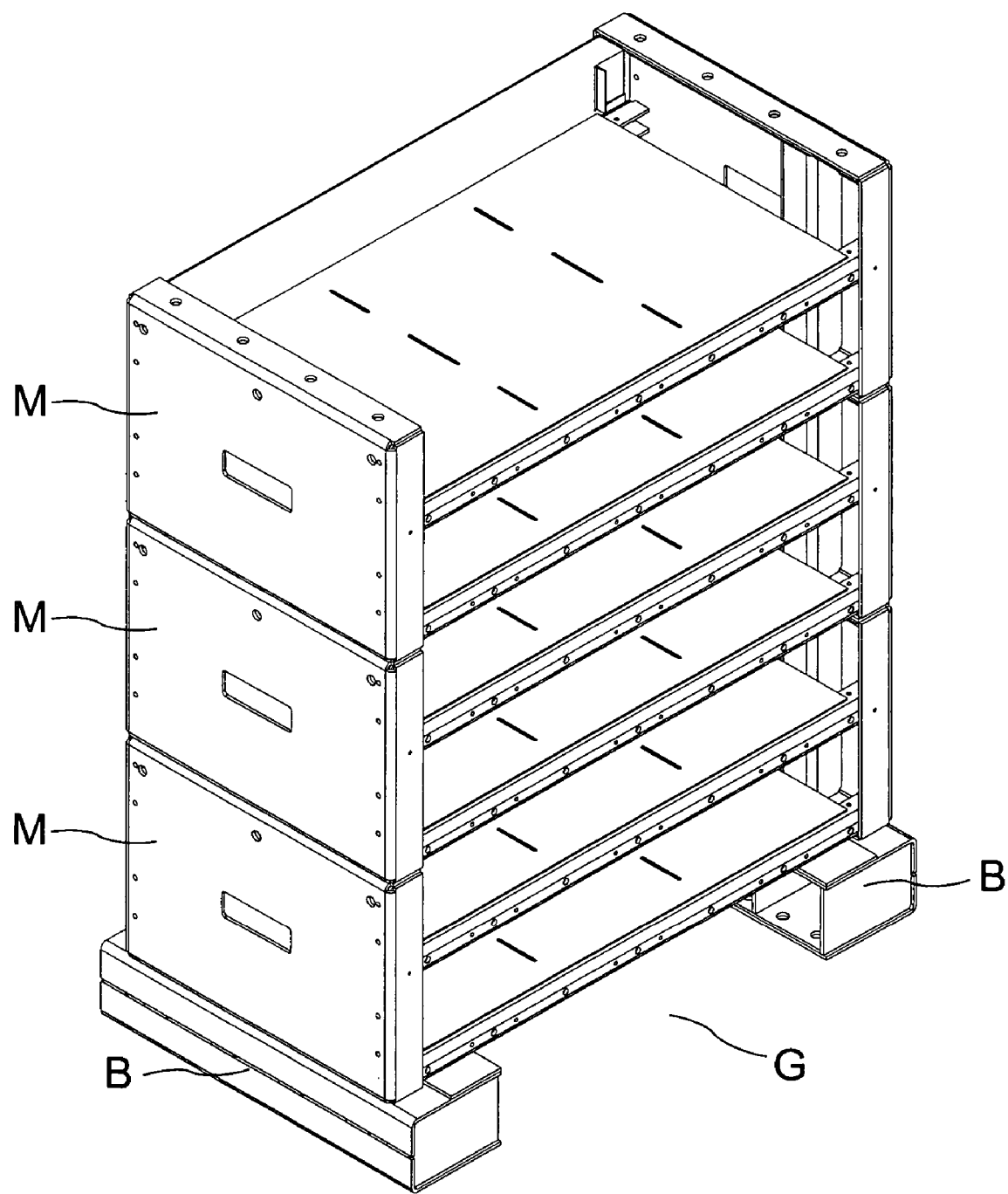
FIG. 13 is a perspective view of a three stack module assembly.
Figure 14:
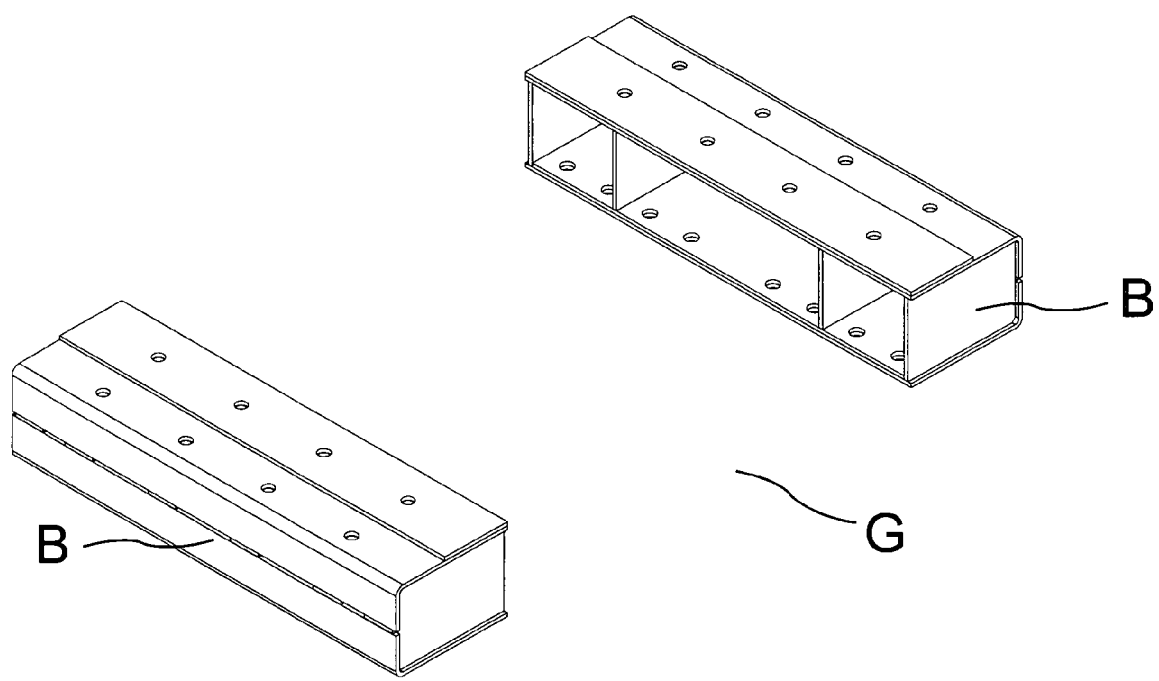
FIG. 14 is a perspective view of the base support members.
Figure 15:
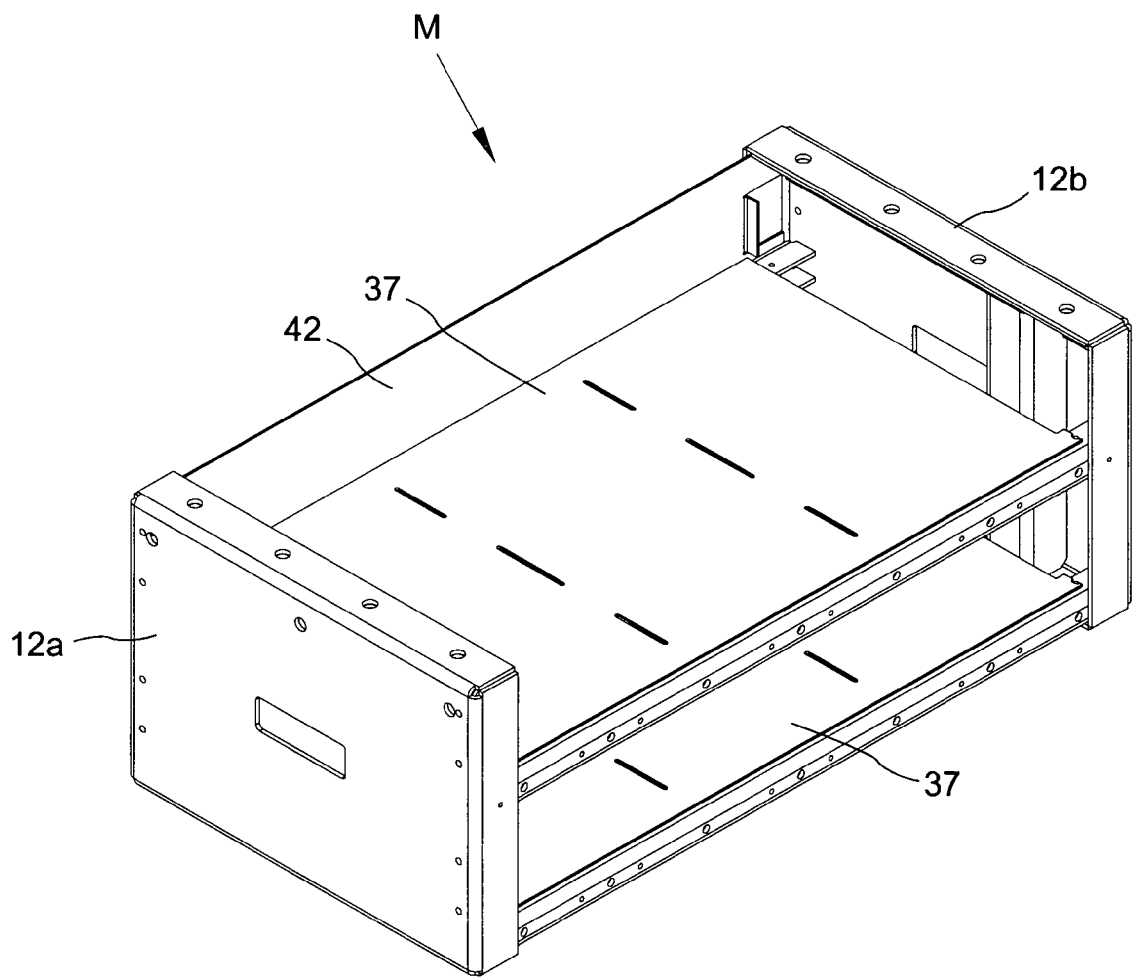
FIG. 15 is a perspective view of a module.
Figure 16:
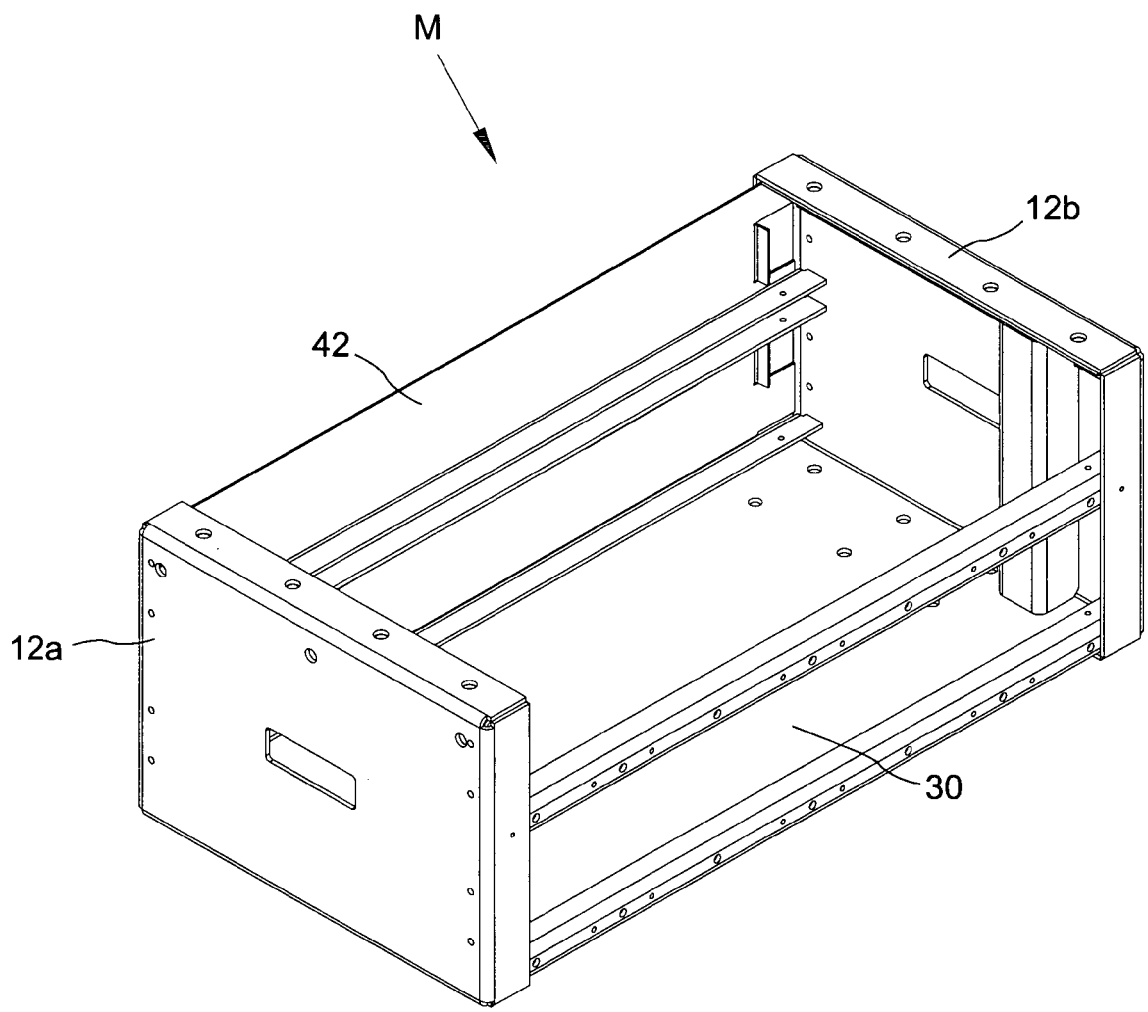
FIG. 16 is a perspective view similar to FIG. 15 with the upper shelf removed to show the internal construction more clearly.
Figure 17:
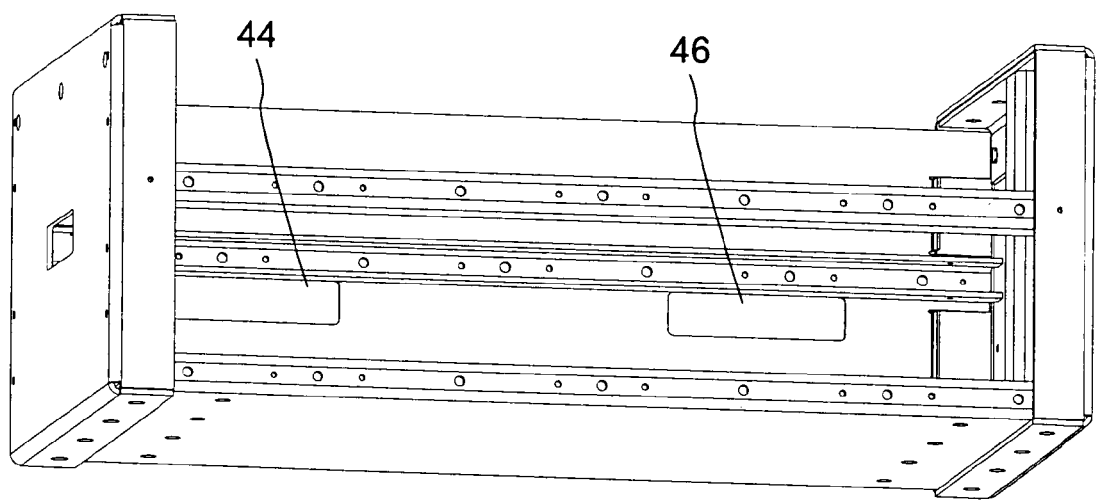
FIG. 17 is a perspective view showing the slots to accommodate a fork lift to transport an individual module from one location to another.

Referring now to the drawings and particularly to FIG. 7, thereof, there is shown a modular battery rack assembly in accordance with the present invention generally designated by the numeral 10. As illustrated, the rack assembly 10 comprises a series of box-like modules M accommodating multiple rows of batteries housed in jackets J and a top cover C. The basic construction of each module is essentially the same and as illustrated can be made with plural tiers so that varying voltage systems can be designed.

Figure 6:
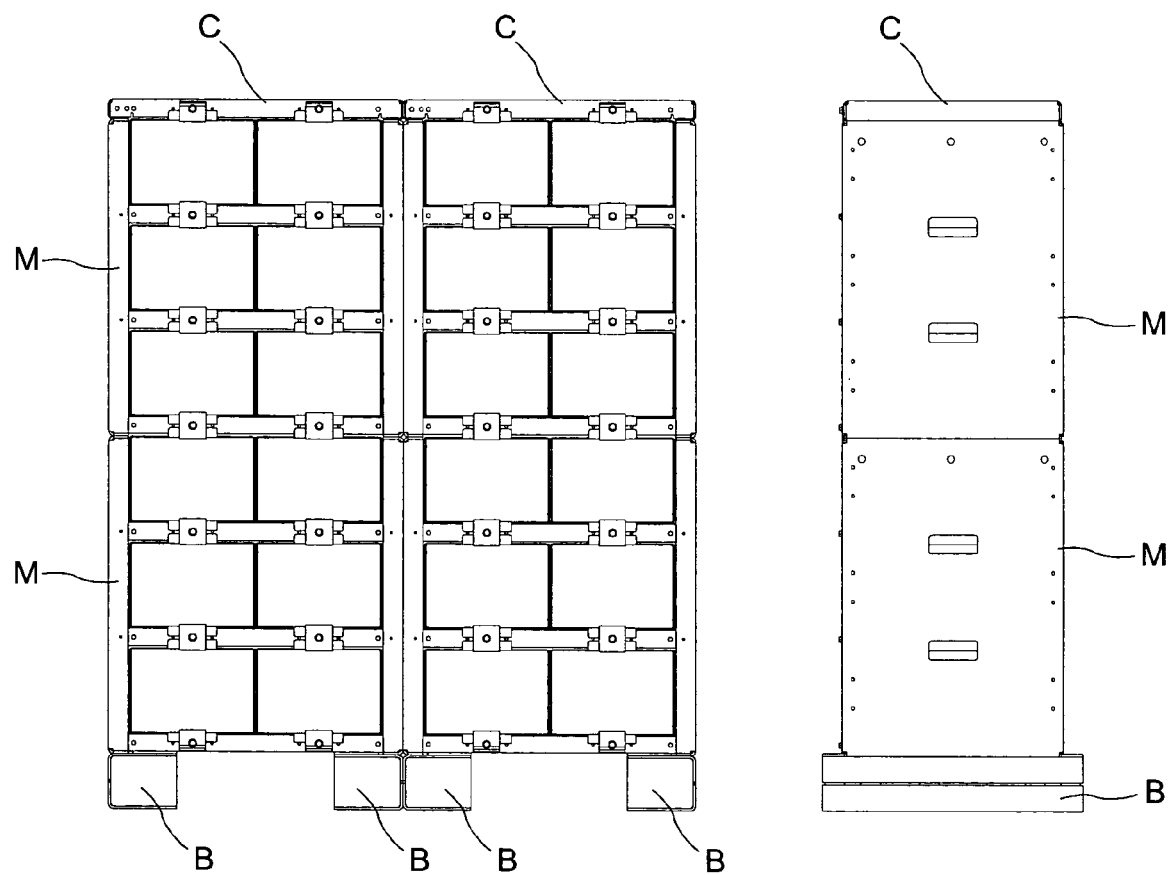
FIG. 6 is still another version of modular assembly showing two modular units secured together in side by side relation.
Figure 18:
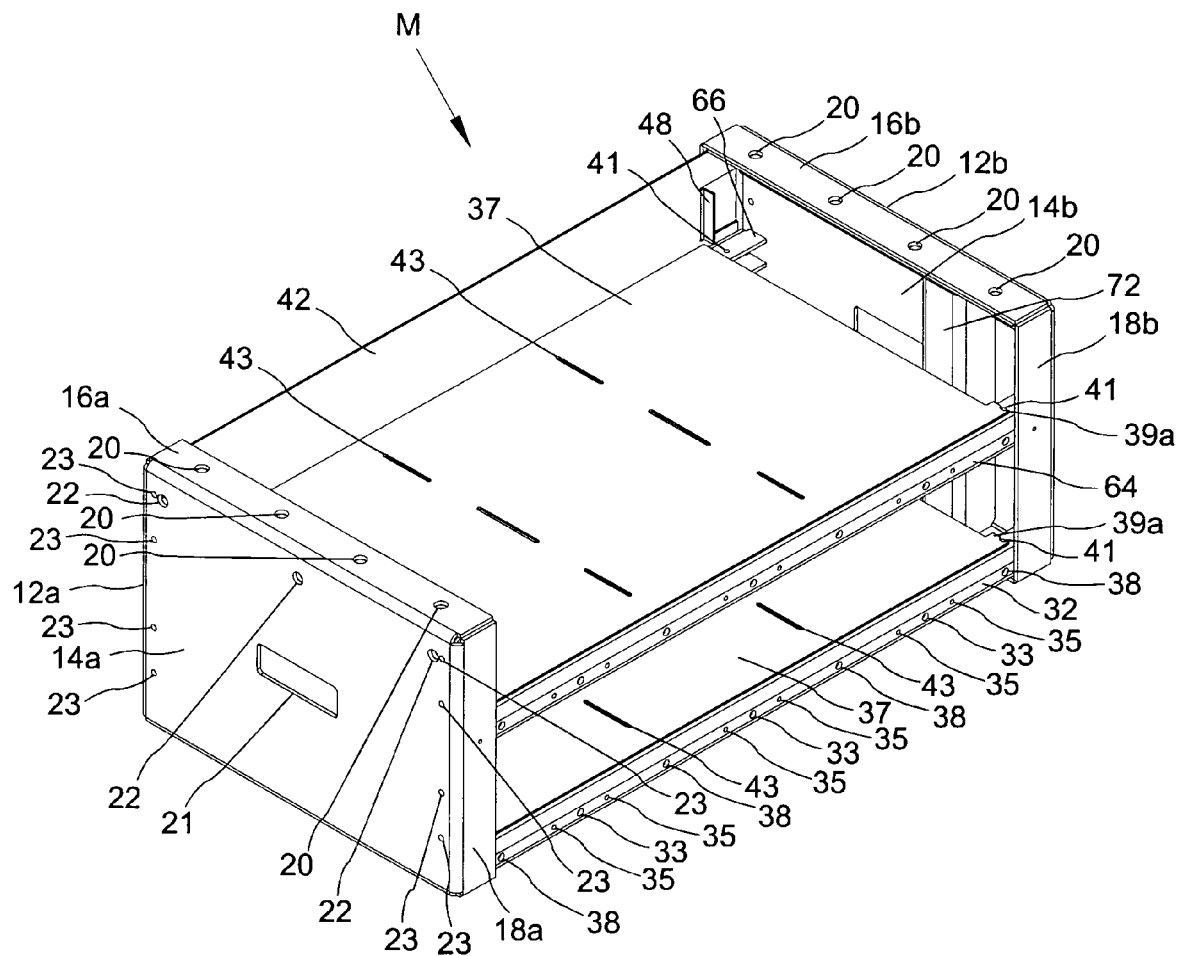
FIG. 18 is a perspective view of a module in accordance with the present invention.

The module M as best illustrated in FIG. 18 comprises a pair of side panels 12a, 12b of identical construction having a generally rectangular face 14a, 14b, top and bottom flanges 16a, 16b, 17a, 17b projecting perpendicularly to the top and bottom edge of the face 14a, 14b. Side flanges 18a, 18b, 19a, 19b connect the top and bottom flanges 16a, 16b, 17a and 17b. The flanges as shown are formed integrally with the faces 14a, 14b to form a one piece side panel. The top flanges 16a, 16b and the bottom flanges 17a, 17b have a series of aligned bolt holes 20 so that adjacent modules can be secured one on top of the other by bolts extending through the aligned holes 20. These holes 20 are all accessible from the open front end of the module. Ventilation/handling holes 21 are located near the center of the face 14a, 14b. A series of holes 22 runs across the top of the face 14a, 14b for bolting adjacent systems in side by side relation (FIG. 6). Holes 23 are located in face 14a, 14b for attachment of battery side termination brackets (not shown).

Figure 20:
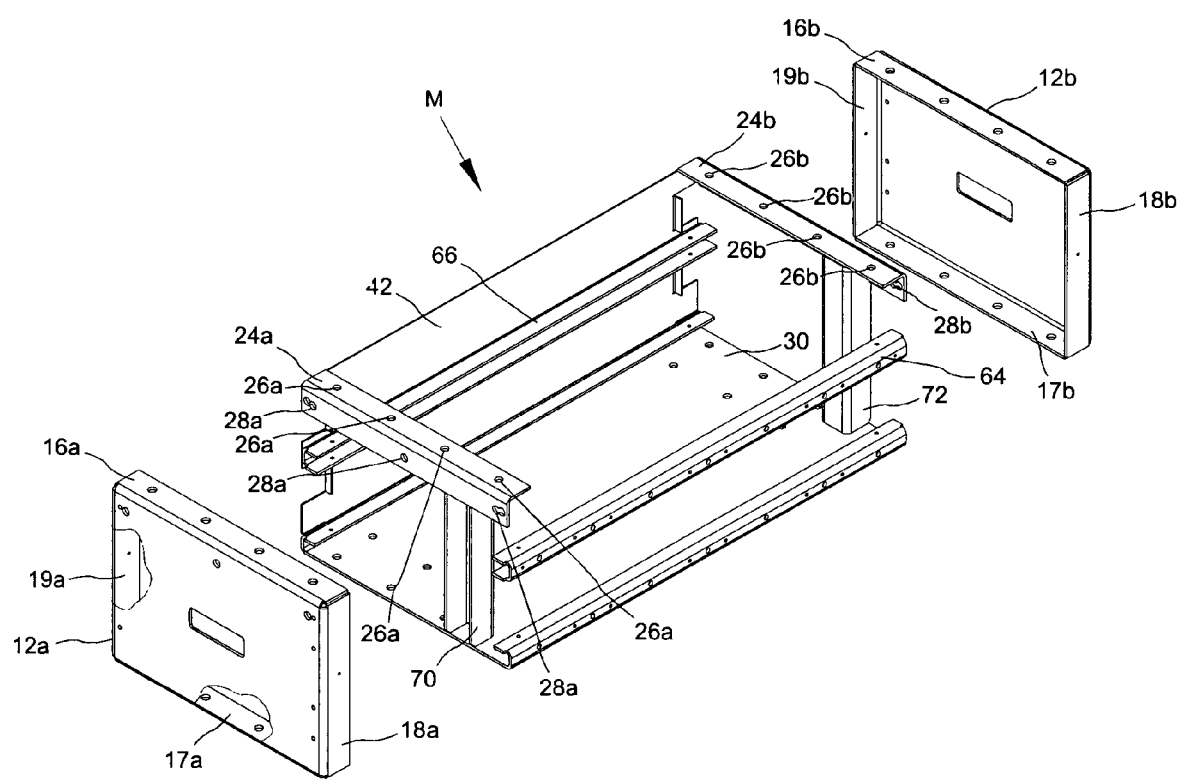
FIG. 20 is an exploded perspective view of the parts comprising the module as shown in FIG. 19.

As best illustrated in FIG. 20, each side panel 12a, 12b has an elongated stiffener 24a, 24b of L-shaped cross section which nests and underlies the top flange 16a, 16b of each side panel and has a series of bolt holes 26a, 26b aligned with the bolt holes 20 in the top flange. The stiffener 24a, 24b has a series of holes 28a, 28b which register with holes 22 in the face of the side panels. The stiffener 24a, 24b is secured in place on the inside of the side panel to provide a strong and rigid cross beam extending from the rear panel to the open front end of the module M.

The module M has a generally rectangular base plate 30 and support channels 32 and 34 formed integrally along the front and rear edges of the base plate. In the present instance, the U-shaped support channels have an open side facing and confronting one another. The vertical face of support channel 32 includes holes 33 for bolting battery retainer plates P1 and P2, holes 35 for attaching grounding bolts for battery jackets J and holes 38 for attaching safety shields. The base plate 30 has a series of anchor bolt holes 36 arranged in a pattern to securely anchor a stack of modules M to a support surface or base assembly B. A bottom shelf 37 overlies the base plate 30 and has a tab 39a, 39b having a semicircular notch 40a or the hole 40b for a screw to ground the shelf by engaging in holes 41 in the front or rear support channels 32, 34. The shelf 37 has a series of ventilation slots 43 defining zones for the batteries.

The module M as best illustrated in FIG. 18 has a generally rectangular back or rear panel 42 which is sized to fit snugly in the side flanges 19a and 19b and secured thereto by a weldment. The back panel 42 has fork lift holes 44 and 46 so that the modules M may be transported from one location to another by a fork lift. Integral tabs 48 are formed in the rear panel 42 to locate and retain the batteries from lateral displacement. The modules M shown and described herein accommodate upper and lower battery compartments and three two-volt batteries in side by side array in each of the two compartments. Thus, there is provided a front shelf support channel 64 of U-shaped cross section which is welded to the side flanges 18a and 18b and face 14a, 14b internally at about the midpoint of the side flanges. A rear support channel 66 of U-shaped cross section secured by welding to the rear panel 42 and the faces 14a and 14b. Note that the ends of the U-shaped support channels are cut back along the base of the U-shaped channel so that they snugly fit the contour of the inside of the side panel at the juncture of the front face 14a, 14b and the side flange 18a, 18b. The front and rear support channels are aligned so that the shelf is level.

The module shown in FIG. 18 is a two (2) tier module wherein the upper tier of batteries is supported on a shelf 37 identical to the bottom shelf with a pattern of ventilation slots 43. The shelf is mounted on front and rear support channels 64, 66 secured by welding at the outer ends to the side panels 12a, 12b. The module is rigidified by a pair of U-shaped vertical support channels 70, 72 extending from the base plate 30 to the top stiffener channel 24a, 24b under flange 16a, 16b of the side panels and spaced a short distance from the front side panel flanges 18a, 18b.

Figure 21:
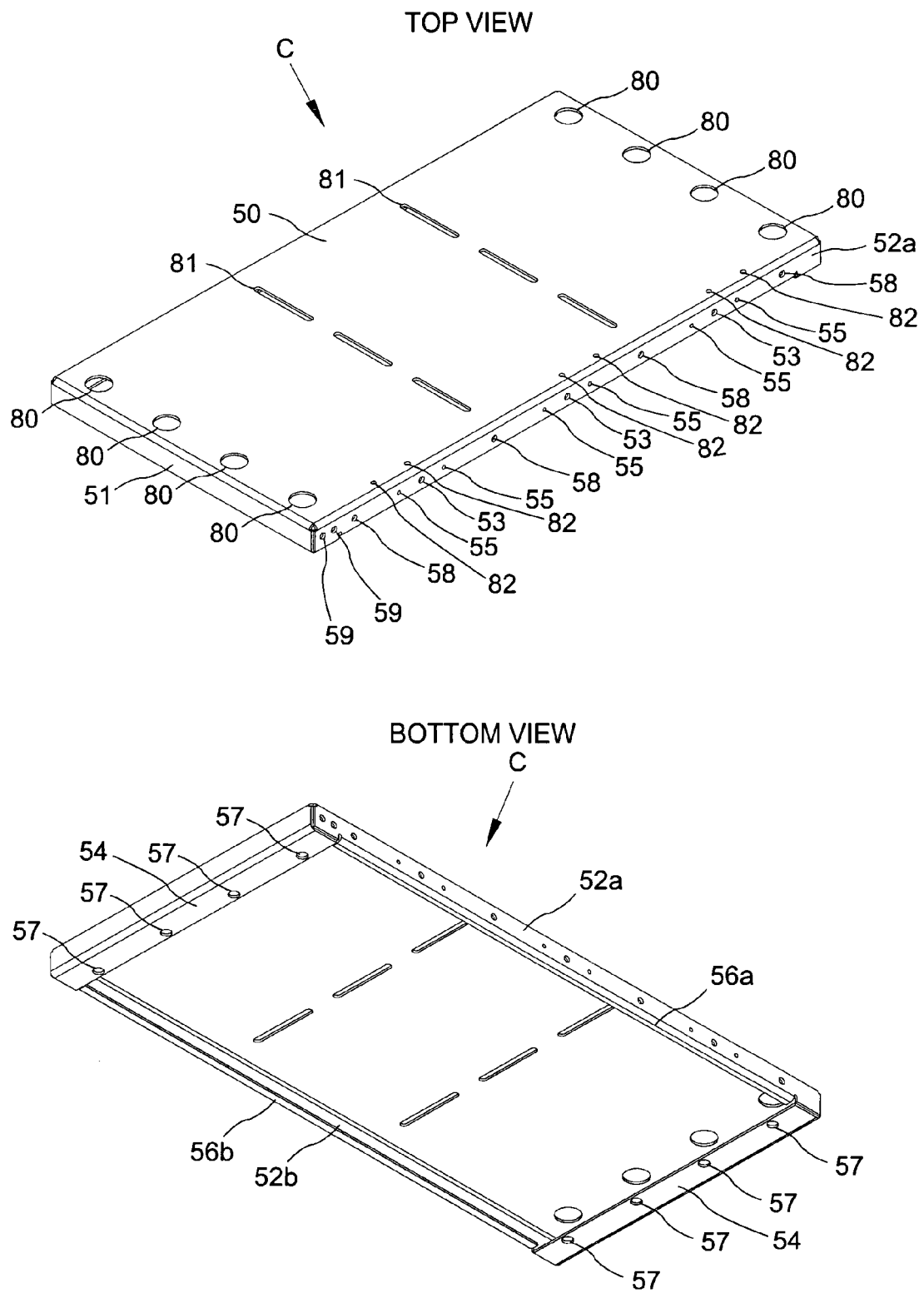
FIG. 21 is a perspective view of a cover assembly.

The top cover C as best illustrated in FIG. 21 is of generally rectangular configuration and has a main face 50, depending side flanges 51 and front and rear flanges 52. The top face 50 has a series of ventilation slots 81 which facilitate circulation to cool the battery cells. There are a series of enlarged access holes 80 along opposing side edges of the cover C which permit application of mounting bolts through openings 57 in the lower flange 54. The front and rear flanges 52a, 52b of the cover C have a longitudinally extending return lip 56a, 56b, the rear lip 56b restraining vertical movement of the battery cells. The face of front flange 52a has a series of holes 53 for retainers P2, holes 55 for grounding jackets J to cover C and holes 58 for mounting safety shields. Holes 59 are for grounding the entire system and holes 82 on top face 50 of cover C are for top termination brackets.

Figure 22:
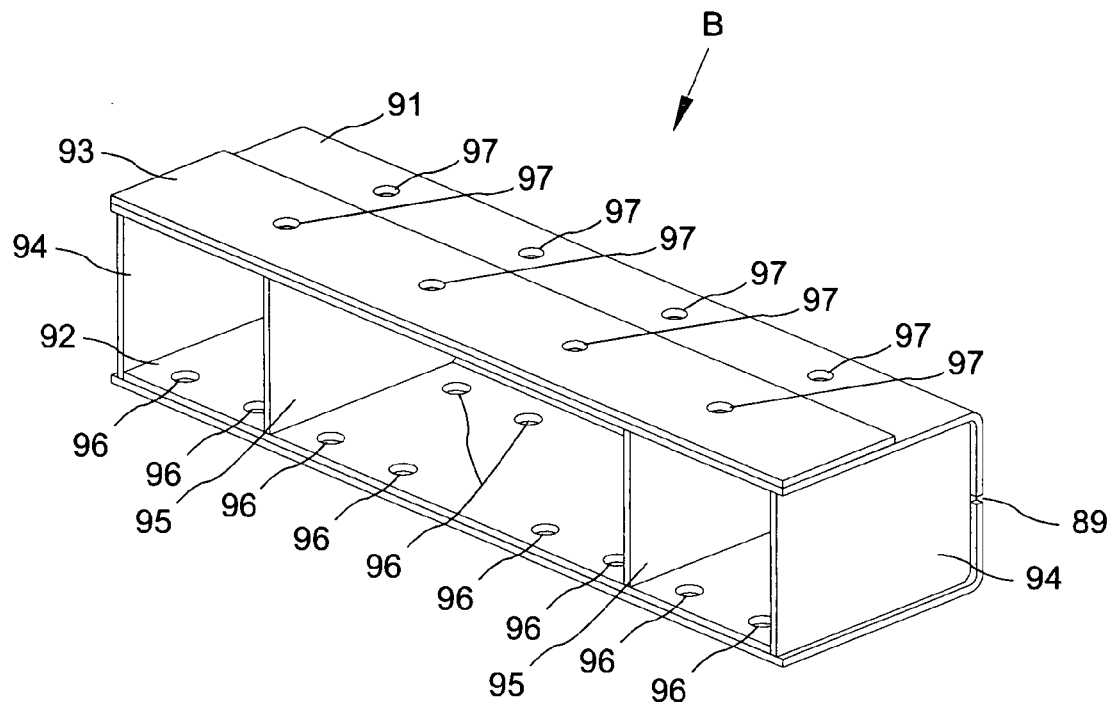
FIG. 22 are perspective views of the base assembly for anchoring the modules to a support surface.
Figure 22:
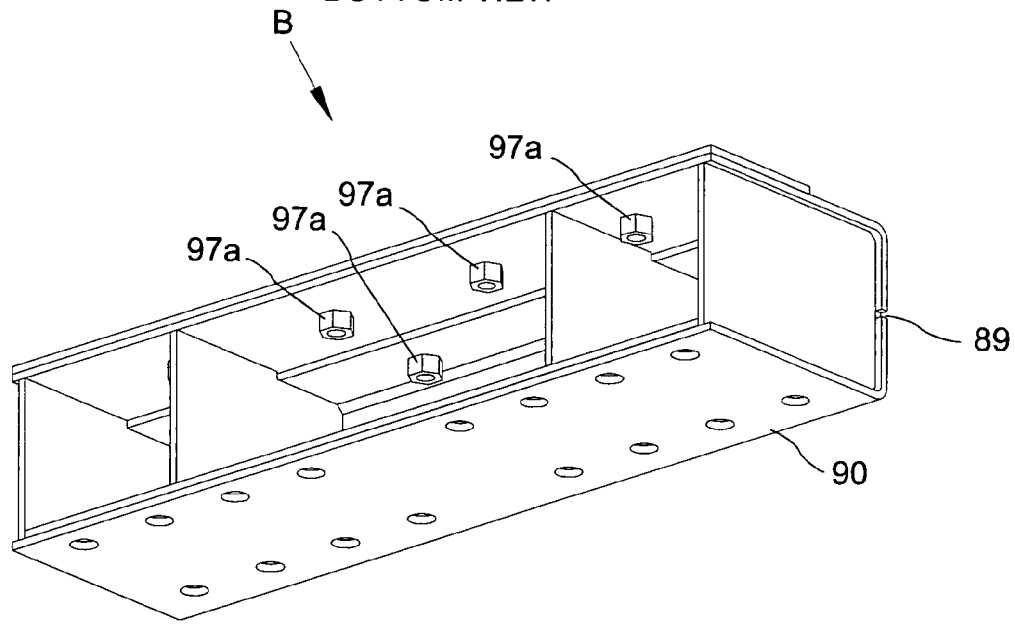
Figure 23:
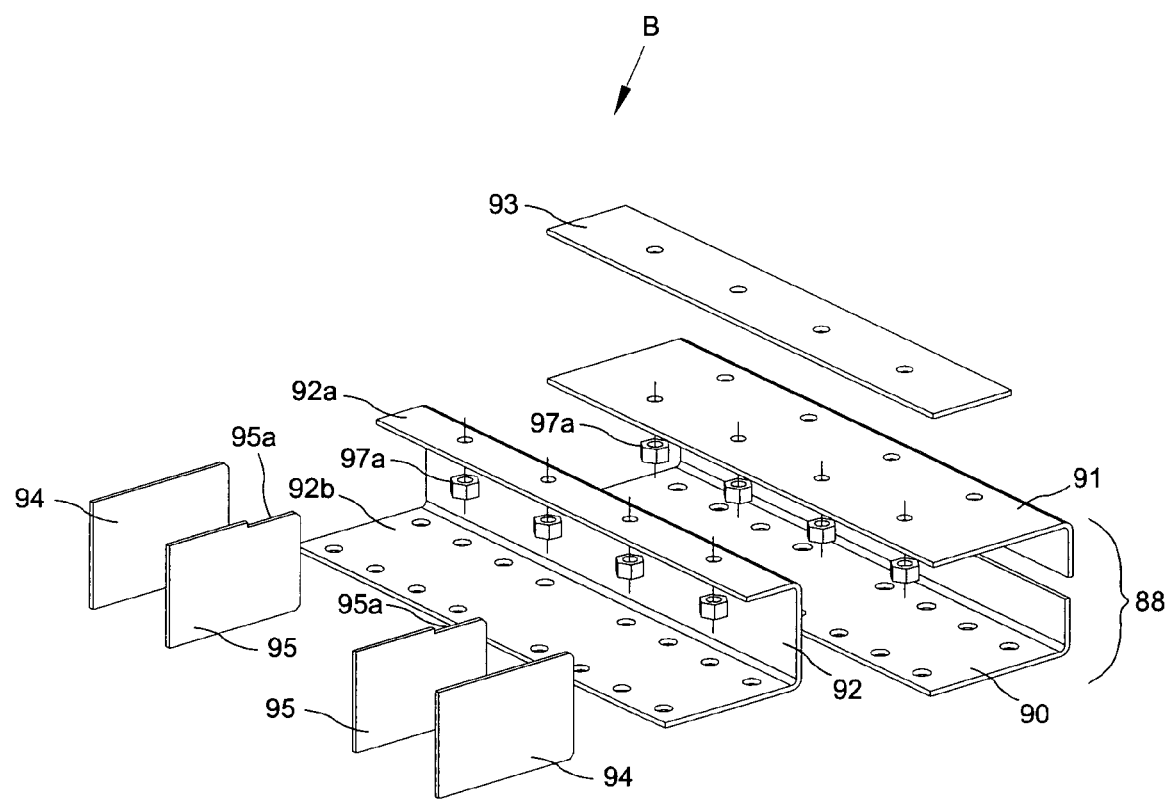
FIG. 23 is an exploded perspective view showing the components of the base assembly.

Spaced base assemblies B support the modules M in the manner shown in FIG. 7. Each base assembly as best illustrated in FIGS. 22 and 23 comprises an inner channel 92 of J-shaped cross section having a short leg 92a and a wider bottom leg 92b and an outer channel 88 comprising a lower channel member 90 and an upper channel member 91 each of L-shaped cross section. The inner channel 92 nests in the outer channel 88 and is secured thereto by slot welds along the elongated slot 89 between the upper and lower channels 90, 91 as shown in FIG. 22. The bottom leg 92b of the inner and outer channels 91, 92 is provided with a pattern of anchor holes 96 which in the assembled relation register with one another. In the present instance, there are 16 anchor holes 96 in each channel. Some of the holes 96 may be redundant to facilitate good anchoring by less than all of the holes in the event that the base holes are aligned with a steel reinforcement in the concrete floor on which the modular system is supported.

Each base assembly includes inner gussets 95 and outer gussets 94 at opposite ends of the base assembly. The inner gussets 95 are notched as at 95a to provide a continuous upper edge when assembled in place in the manner shown in FIG. 22. A stiffener plate 93 is mounted on the top face of the upper portion 91 of the outer channel 88 and overlies the holes 97 spaced inwardly from the back edge thereof to define a stepped arrangement as shown in the top view of FIG. 22. This provides a flush mounting with the step at the bottom of a module where the lower flange of the side panel projects beyond the base plate 30 as shown in FIG. 1a. Hex nuts 97 are welded to the underside of the short flange 92a of the inner channel 92 and to the underside of the upper channel portion 91 to facilitate the assembly of the lower most module to the base assembly B.

Consider now assembly of modules M in accordance with the present invention and installation of an array of modules with batteries at a designated site. As explained above, most of the components of the module M can be made and assembled off site and together with the base components, batteries B and jackets J can be transported separately to the site which eases transport weight wise.

Figure 19:
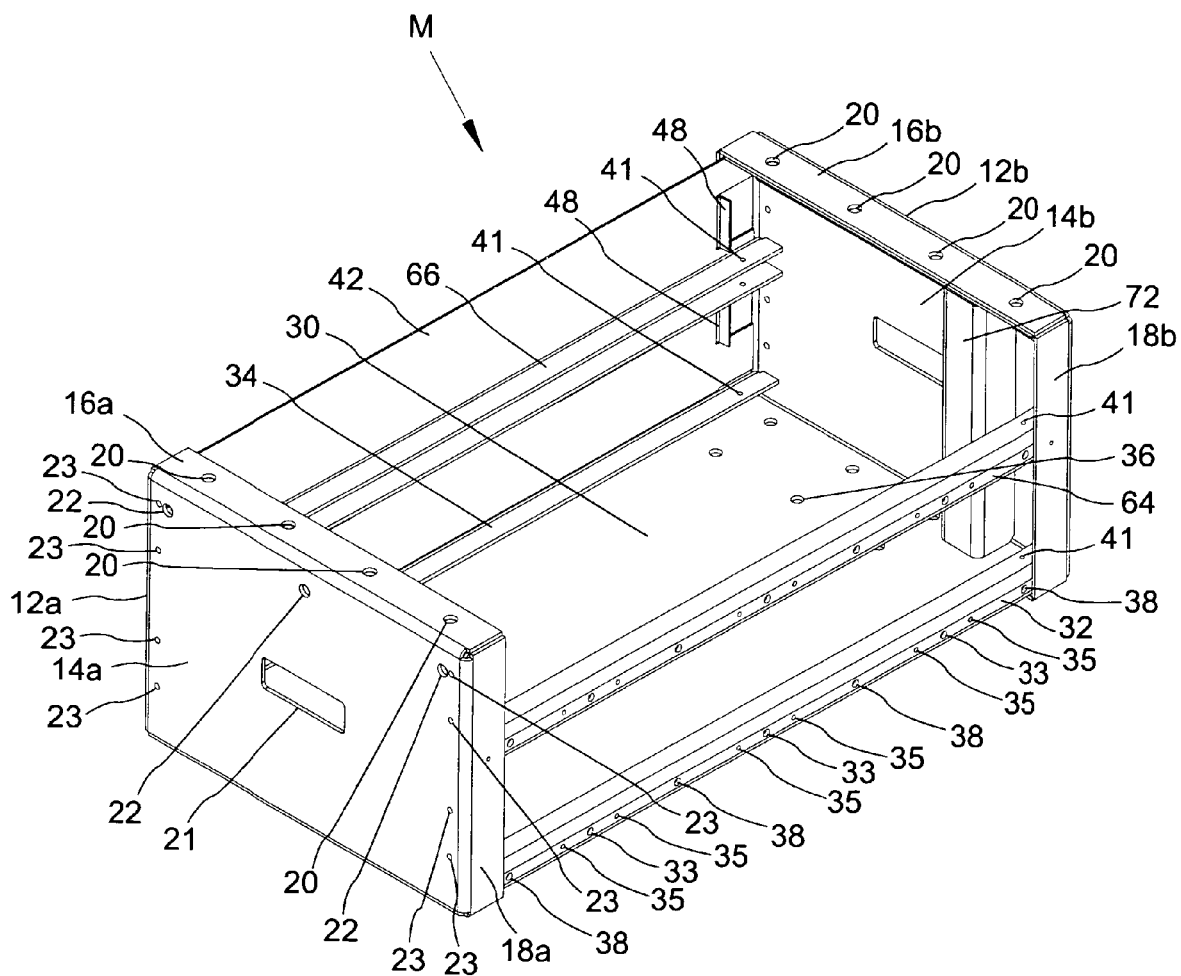
FIG. 19 is a perspective view similar to FIG. 18 with the shelf for the upper tier removed.

The main components of the module M are assembled as follows. The side panels 12a, 12b are positioned in a fixture in spaced relation with the base panel 30 engaging interiorly in the manner shown in FIG. 19. The back panel 42 and the front and the rear lateral supports are also pinned in place. These components of the module M are then welded together by conventional means. The vertical channel and the L-shaped top flange stiffener are clamped in place and thereafter secured to the end panels by welding.

Figure 2:
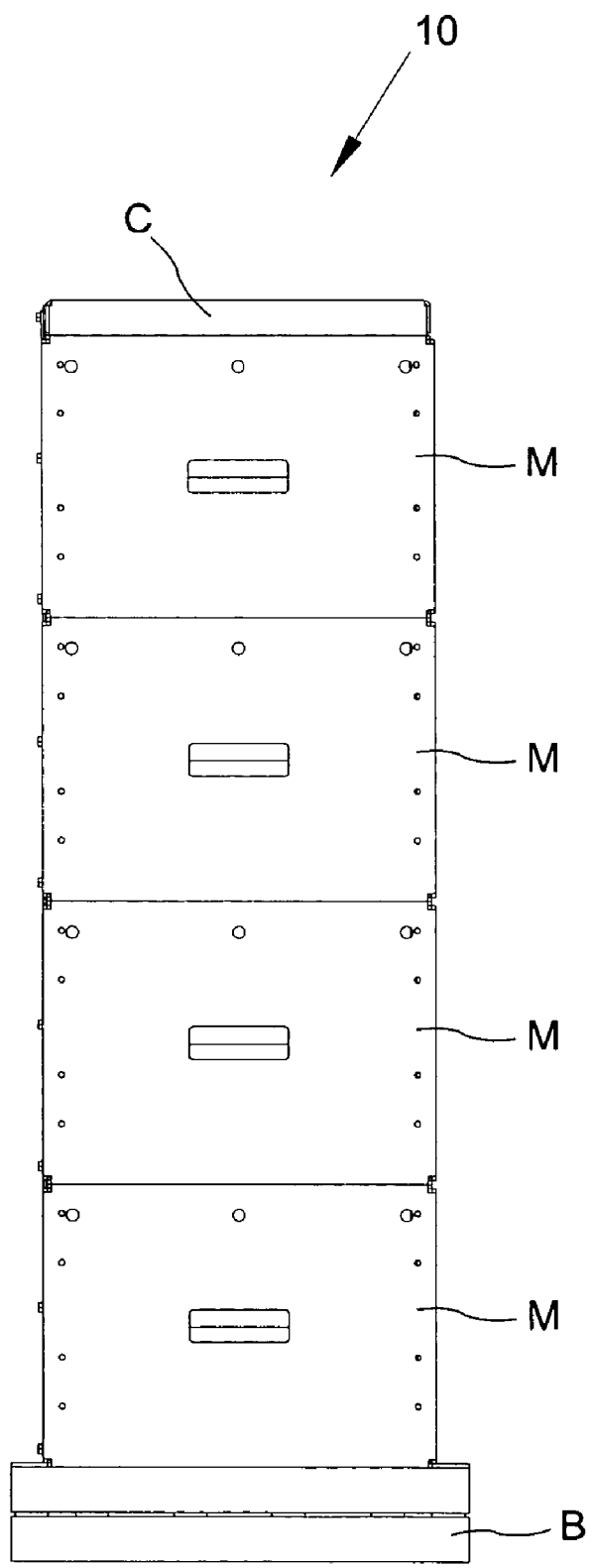
FIG. 2 is a side elevational view of the module assembly of FIG. 1.
Figure 3:
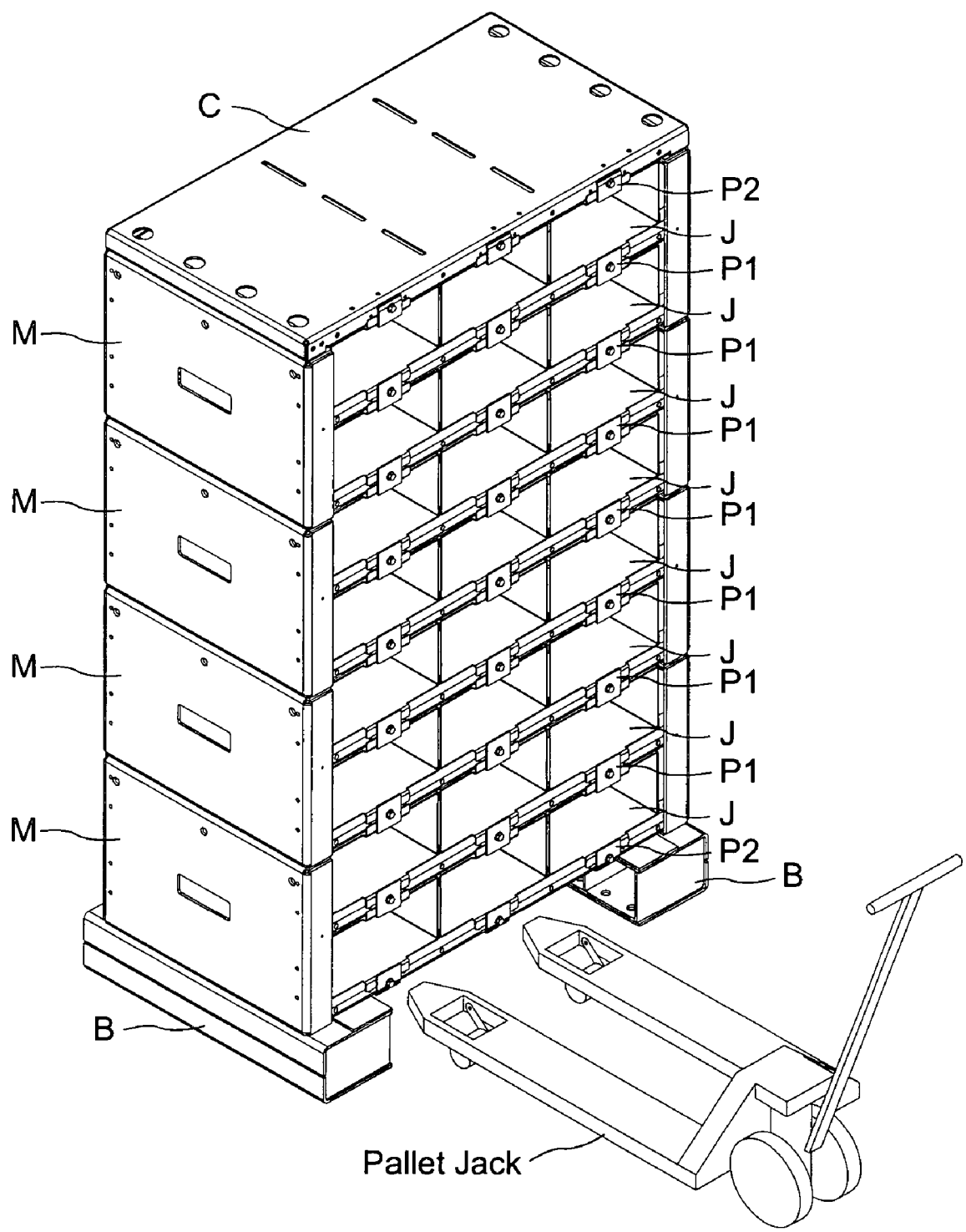
FIG. 3 is a perspective view of the modular rack assembly showing a base construction defining a slot accommodating a pallet jack for transporting the modular rack assembly during the anchoring process.
Figure 4:
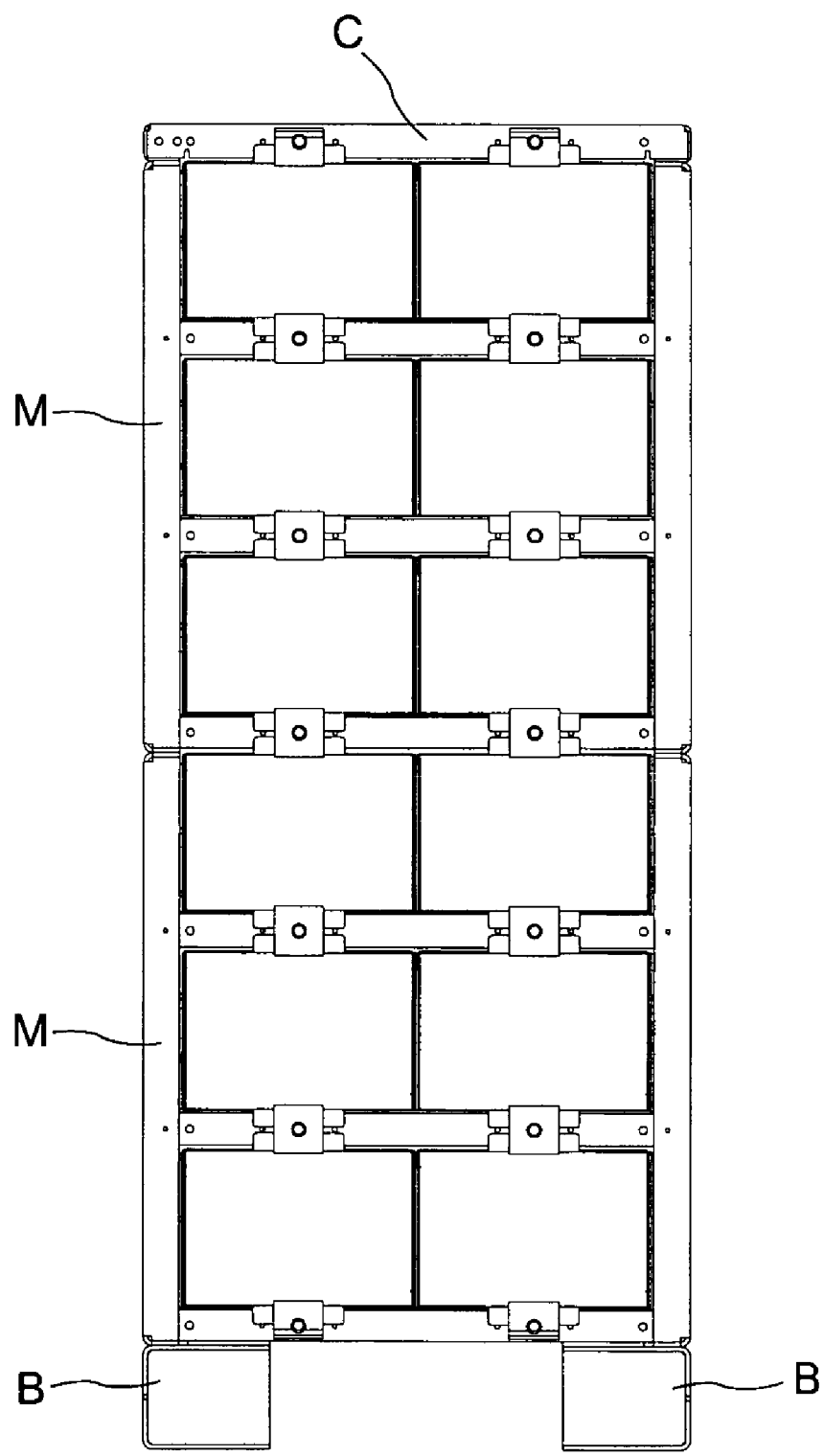
FIG. 4 is a front elevational view of a two module system wherein each module has three tiers.
Figure 5:
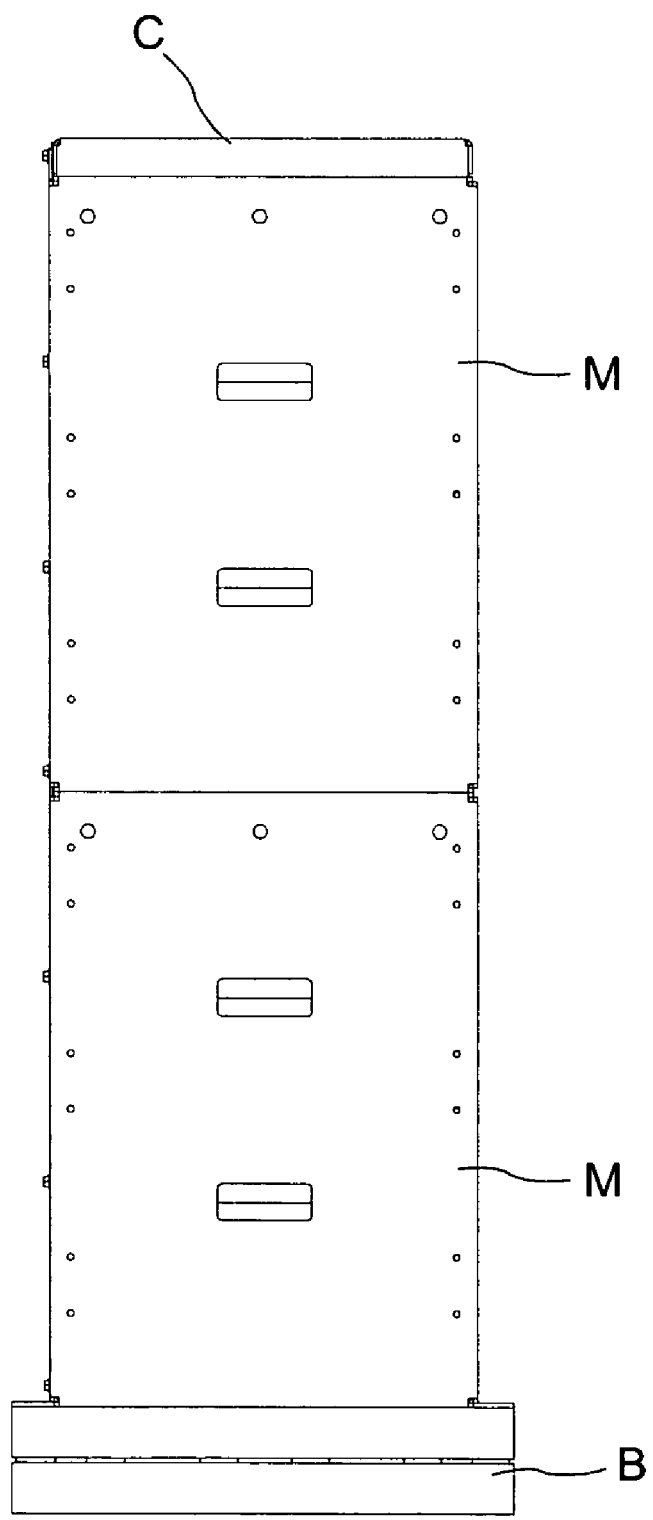
FIG. 5 is a side elevational view of the module assembly shown in FIG. 4.

The modules M are then individually taken to the installation site and there assembled and secured to one another to form the desired array for a 48 volt system shown in FIG. 3.

The base assemblies B are then connected to the lower most module M by bolts which can be easily positioned and turned through the open front access of the module M. The subassembly comprising base members and lower most module are then positioned in the desired site location and anchor hole markings are made by the installer through the open front access provided by the gap G between the base assemblies B and the open sides of the base members confronting the gap G (See FIGS. 3 and 7).

The subassembly is then retracted by pallet jack from the site to expose the anchor markings for drilling anchor holes.

The subassembly is then anchored in place, followed by stacking and connecting the additional modules all done via the open front access. The cover C is assembled to the top module. The battery cells and jackets J may then be assembled in the tiers of the modules M and secured in place in the conventional fashion by retainers P1, P2 which secure the jackets to the channel supports. Suitable grounding hardware completes the assembly.

Even though a particular embodiment of the present invention has been illustrated and described herein, it is not intended to limit the invention and changes and modifications may be made therein within the scope of the following claims.

What is claimed is:

1. A combination comprising a module for a battery system supporting batteries during seismic stress comprising a pair of side panels, each panel formed of material such as steel shaped to define a generally rectangular face and top and bottom flanges extending generally perpendicularly to the face along top and bottom edges thereof and side flanges formed integrally with the face and top and bottom flanges;

a base plate having means for mounting the module to a support surface having a generally U-shaped channel formed integrally along the front and rear edges of the base plate;

a rear panel extending between and nested in the side panels and secured thereto and the base plate;

at least one pair of front and rear support channels extending between the side panels;

a shelf for batteries supported on the base plate and support channels;

a support channel extending vertically between the top and bottom flanges;

means for securing modules stacked one on top of another along the top and bottom flanges;

a pair of spaced base assemblies defining a gap there between to accommodate a fork lift to move the base assemblies and modules from one location to another during an installation process;

said base assemblies being of box like structure having confronting opening sides for access to the module bolt holes and anchor bolt holes from the gap between the base assemblies; and each base assembly comprising an inner channel of J-shaped cross section having a short leg and a wider bottom leg and an outer channel comprising a lower channel member and an upper channel member each of L-shaped cross section and wherein the inner channel nests in the outer channel and is secured thereto by spot welds along the elongated slot between the upper and lower channels and a plurality of spaced gussets and a pattern of bolt holes in the channel members for anchoring the base assemblies and modules to a support surface and which are accessible through the gap between the base assemblies.

* * * * *